United States Patent [19]

Allen et al.

[11] Patent Number: 5,491,822
[45] Date of Patent: Feb. 13, 1996

[54] MULTI-PHASE COMMIT PROCESSING FOR CREATION AND DELETION OF MANAGED OBJECTS

[75] Inventors: Wade C. Allen, Durham; Jeremy P. Goodwin, Raleigh, both of N.C.; Robert L. Nielsen, Zumikon, Switzerland; Paul J. Reder, Durham; Douglas Toltzman, Hubert, both of N.C.

[73] Assignee: International Business Machines Corporation, Armonk, N.Y.

[21] Appl. No.: 175,904

[22] Filed: Dec. 30, 1993

[51] Int. Cl.$^6$ .................................................... G06F 19/00
[52] U.S. Cl. ...................... 395/700; 364/261; 364/240.8; 364/283.4; 364/DIG. 1
[58] Field of Search ...................................... 395/650, 700

[56] References Cited

U.S. PATENT DOCUMENTS 5,317,742  5/1994  Bapat ...................... 395/700

Primary Examiner—Alvin E. Oberley
Assistant Examiner—John Q. Chavis
Attorney, Agent, or Firm—Gerald R. Woods

[57] ABSTRACT

Managed Object Instances (MOIs) in a network of OSI computing systems are created, or deleted, without disrupting their interaction with other managed object instances. This is accomplished by a multi-phase commit process operation where in the first phase, a create or delete request is verified, and the CMIP platform places the created or deleted MOI on a pending list in the CMIP platform, along with information identifying the location of the MOI in a hierarchy of MOIs. In the second phase, the object being created or deleted is asked to accept, or reject, the request. The object responds saying that it accepts or rejects the request. If the request is acceptable, the CMIP platform finishes the object's connection to the tree hierarchy, or disconnects the object from the tree. Then the CMIP platform sends back a message to the object to acknowledge the creation of the object, or to tell the object to delete itself. Finally, the CMIP platform sends a request completion message to the manager.

15 Claims, 15 Drawing Sheets

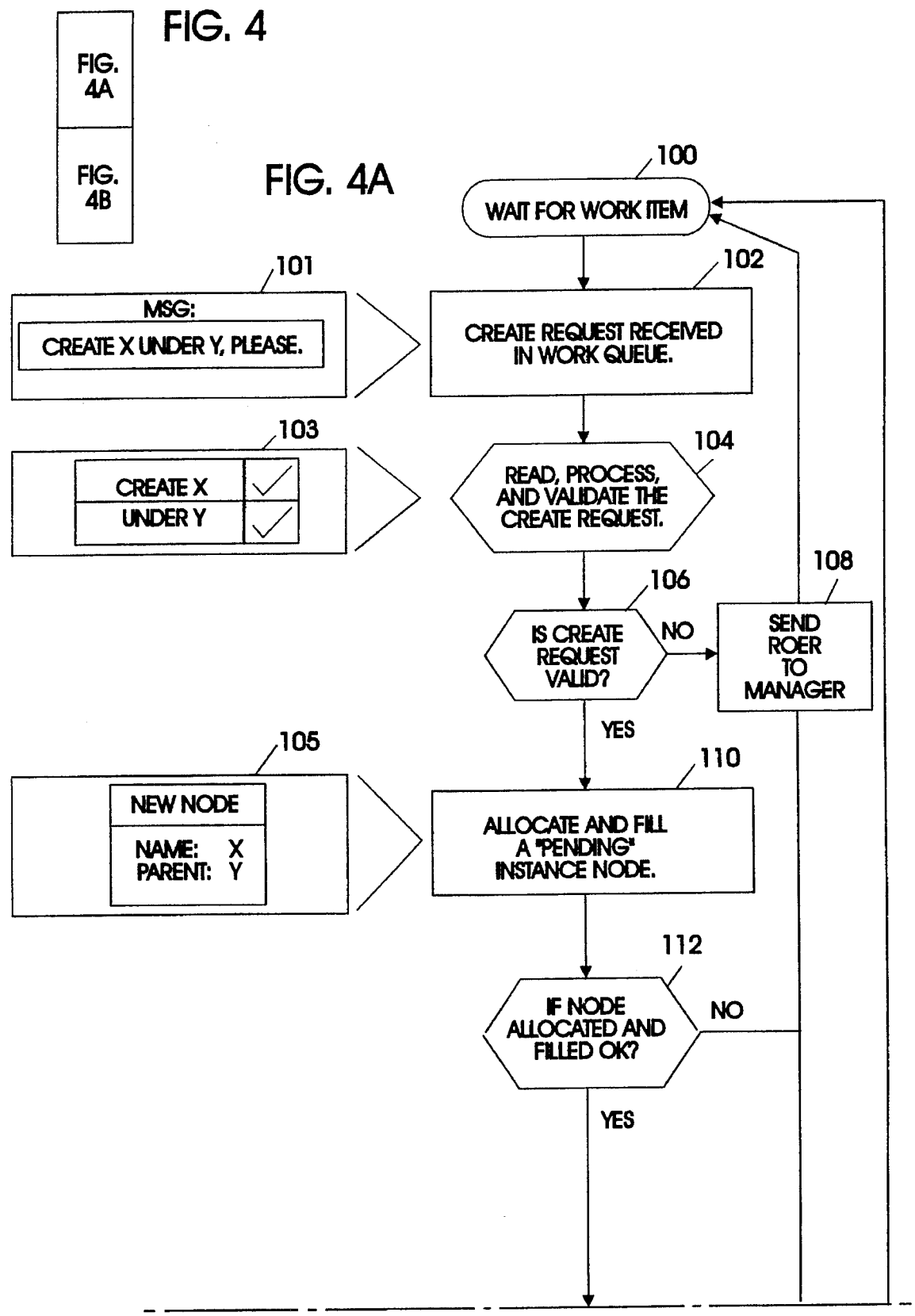

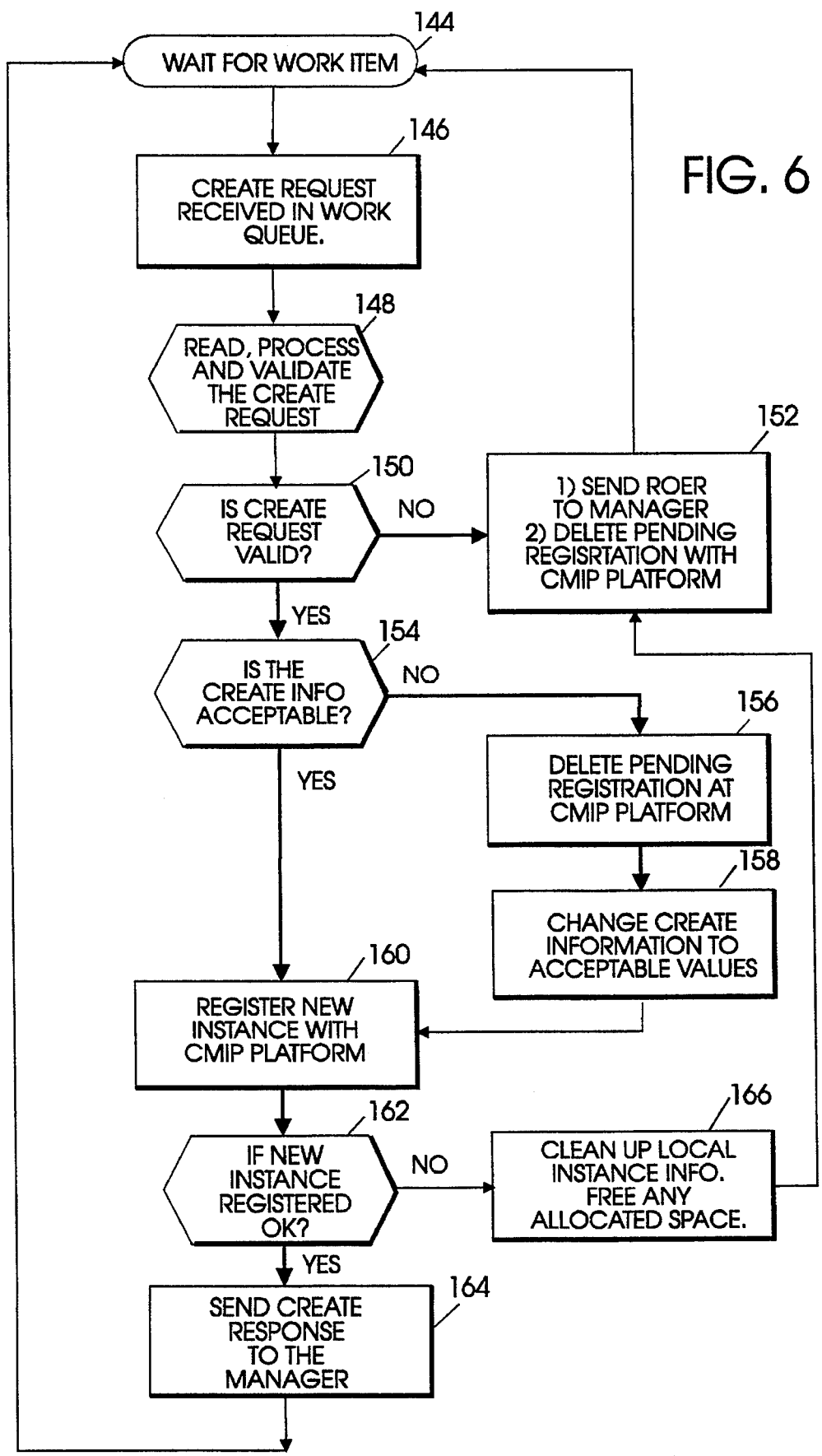

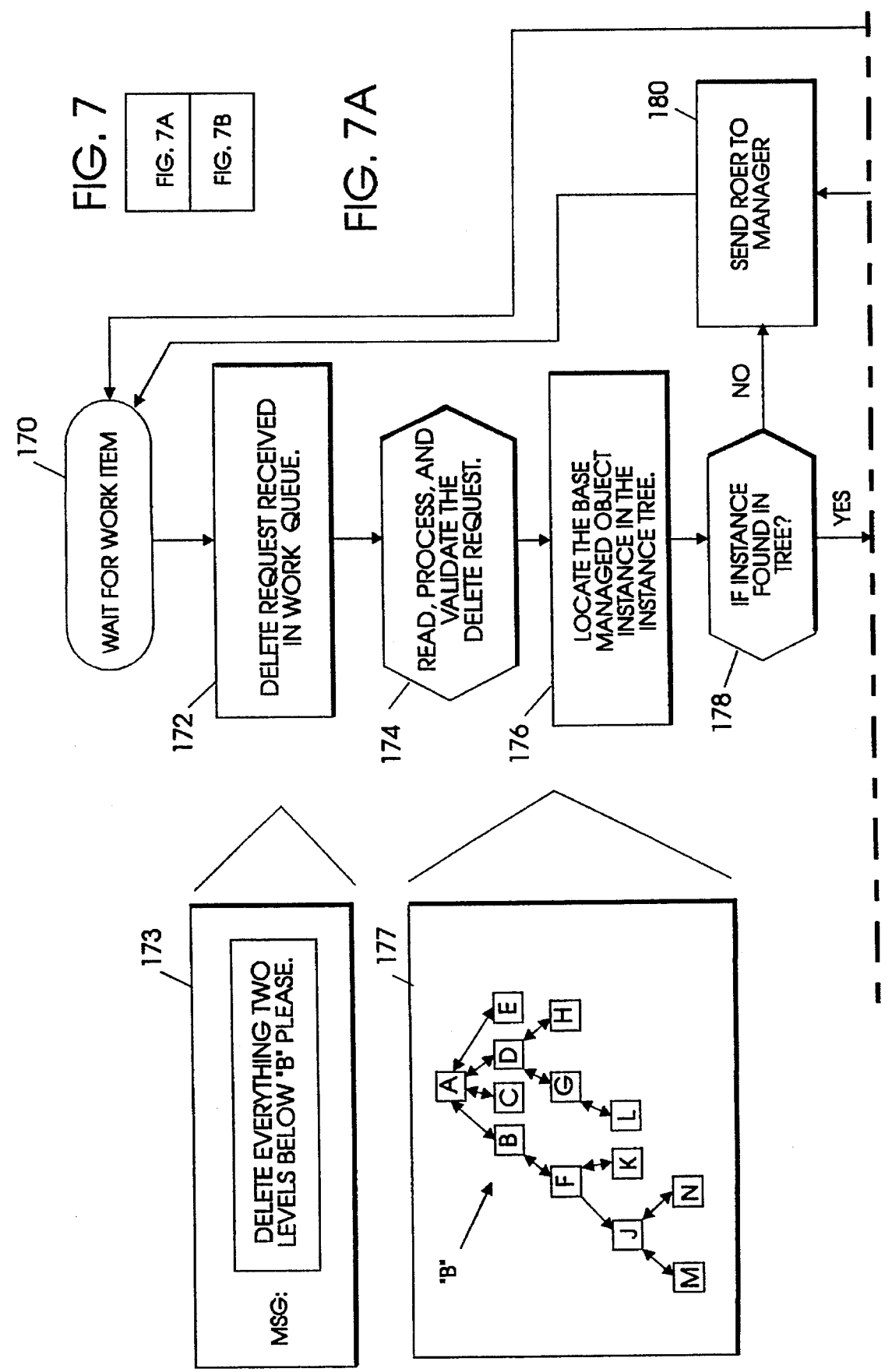

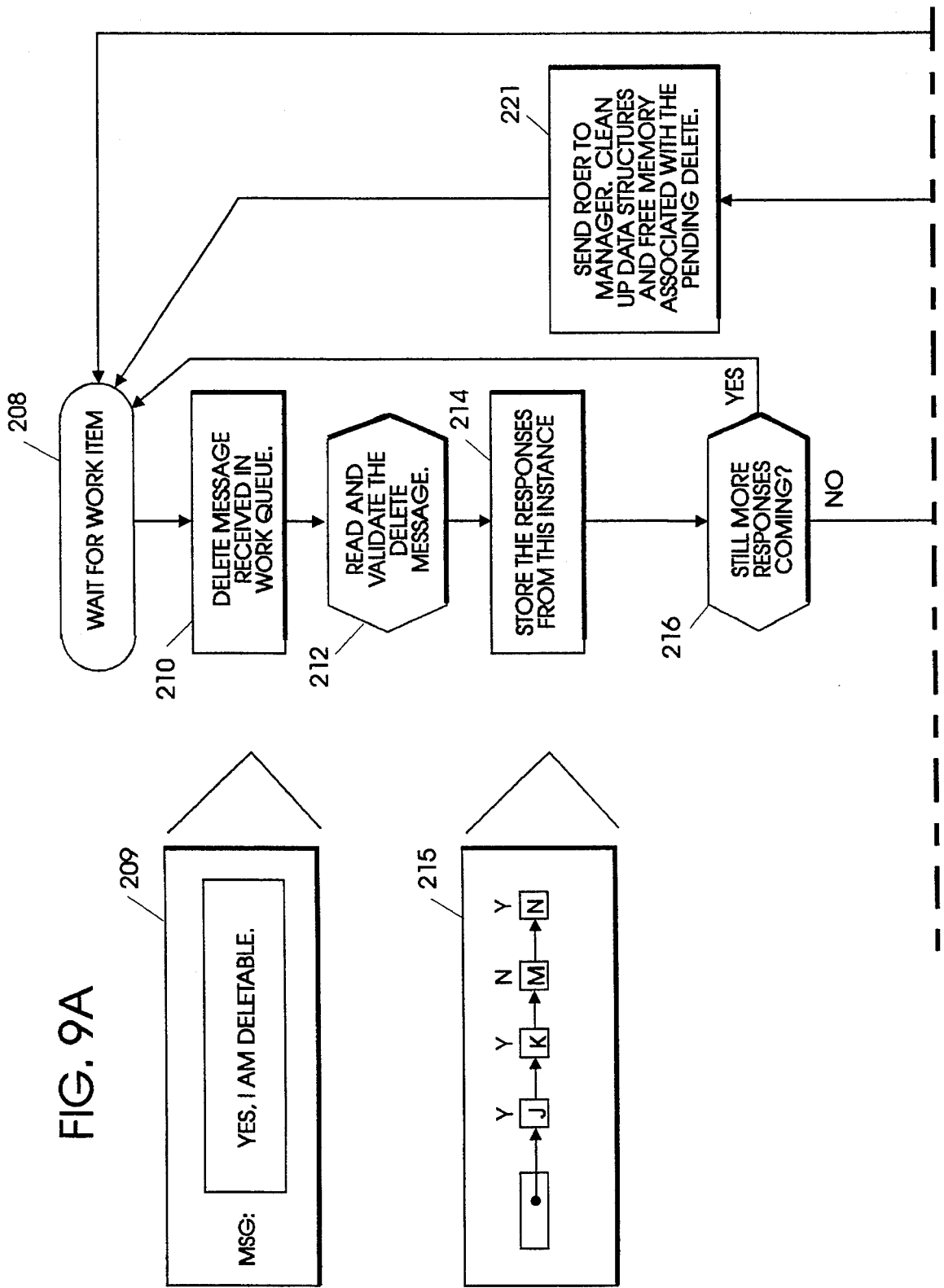

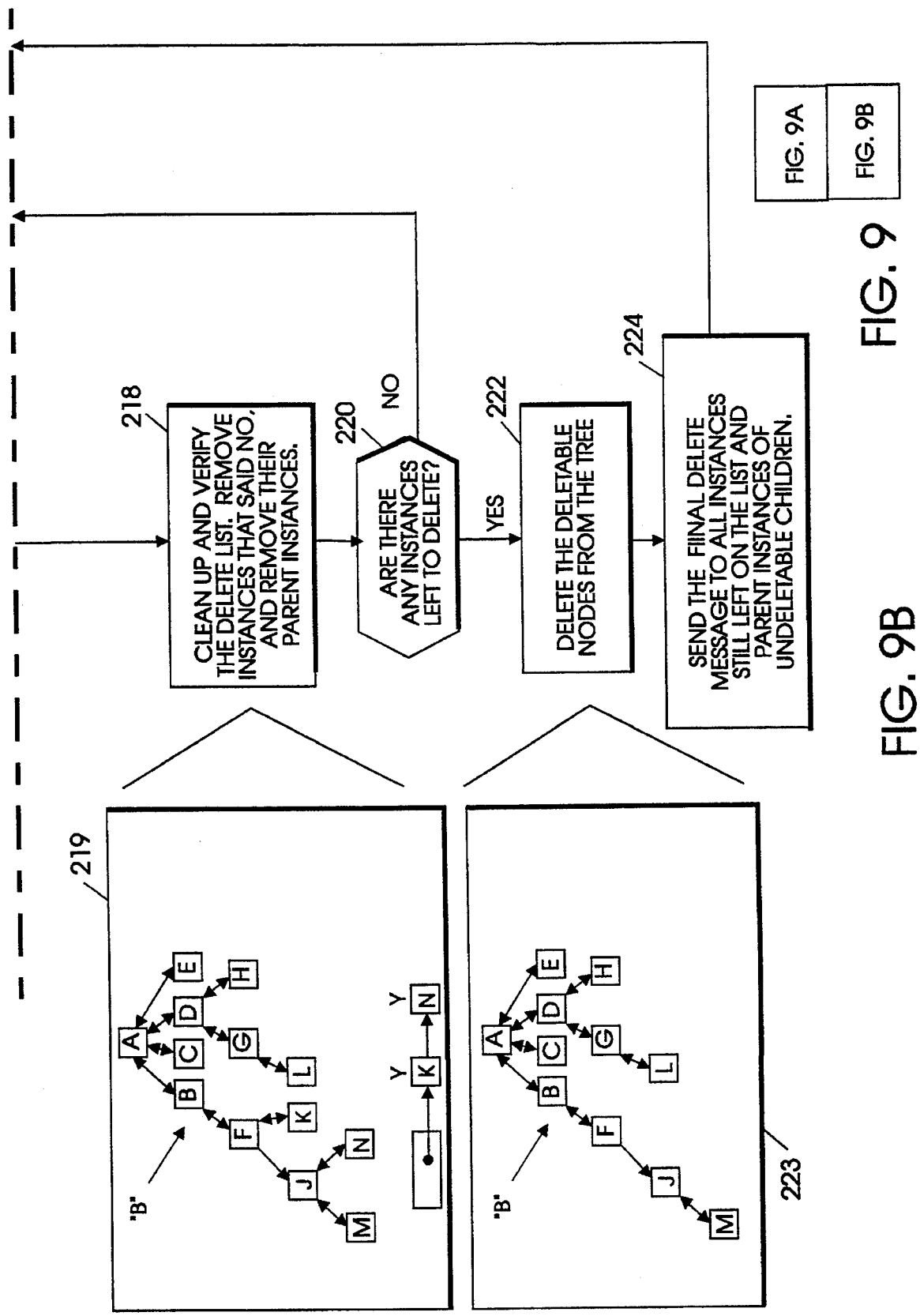

MULTI-PHASE COMMIT PROCESSING FOR CREATION AND DELETION OF MANAGED OBJECTS

BACKGROUND OF THE INVENTION

1. Field of the Invention

This invention is directed to managing certain operations between an Open Systems Interconnection (OSI) manager and agent running on a Common Management Information Protocol (CMIP) platform. More particularly, the invention relates to multi-phase commit processing of the creation and deletion of managed object instances at an agent by a manager.

2. Description of Prior Art

Manager applications running in a first OSI computing system create and delete objects in an agent application running on a second OSI computing system. The manager application runs on top of a CMIP platform at the first system and, similarly, the agent application runs on top of a CMIP platform at the second system. The create and delete requests from the manager are communicated through the CMIP platform at the first system through a network to the second system and its CMIP platform and, finally, to the agent at the second system. The execution of the creation and deletion requests by the CMIP platform in the second computing system is at a separate program level from the agent application running on the CMIP platform. Accordingly, there is a communication lag between the CMIP platform executing the manager's requests (in this case, create and delete), and the agent whose managed object instances are being created and deleted.

The Managed Object Instances (MOIs) at the agent are performing operations simultaneously that may have overlapping effects on each other. Therefore, creation and deletion requests must be handled between the CMIP platform and agent in the agent's computing system in a manner synchronized with other operations taking place at the MOIs directly or indirectly affected by the creation or deletion of an MOI.

To date, this problem has been dealt with in one of three ways. First, the Managed Object Instances (also referred to simply as managed objects) have been moved into the CMIP platform level of programs in order to eliminate any delay in communication between the CMIP platform and the managed objects. Second, certain simplifying assumptions about the integrity of the managed objects have been made when executing the create and delete requests. Third, the create and delete functions have been moved to the objects rather than being handled by the CMIP platform.

There are several difficulties with the first approach of placing the objects in the CMIP platform. Flexibility is lost in terms of being able to extend and add to the objects, to distribute the objects to different systems, and to be able to add new objects without recompiling the entire platform. The second approach also limits flexibility and, in addition, reduces the power of functions that can be offered with the objects. Object functions that extend the effectiveness of the object to other objects are eliminated. In this way, objects can be deleted and created with no impact on other objects; however, the power and effectiveness of objects is greatly reduced. The difficulty with the third approach is, of course, that the functions transferred onto the objects, including coordinating creation and deletion of objects, load down the processing power of the objects and reduce their performance.

SUMMARY OF THE INVENTION

In accordance with this invention, managed object instances remain independent, powerful and flexible and yet may be created, or deleted, without disrupting their interaction with other Managed Object Instances. This is accomplished by a multi-phase commit process operation where in the first phase, a create or delete request is verified, and the agent's CMIP platform places the created, or deleted, object on a pending list along with information identifying the location of the MOI in a hierarchy of MOIs. In the second phase, the object being created or deleted is asked to accept, or reject, the request. The object responds saying that it accepts or rejects the request. If the request is acceptable, the CMIP platform in the third phase finishes the object's connection to the tree hierarchy, or disconnects the object from the tree. Then the CMIP platform sends back a message to the object to acknowledge the creation of the object, or to tell the object to delete itself. Finally, the CMIP platform sends a request completion message to the manager.

Other advantages and features of the invention will be understood by those of ordinary skill in the art after referring to the complete written description of the preferred embodiments in conjunction with the following drawings.

BRIEF DESCRIPTION OF THE DRAWINGS

FIG. 6 shows the flow of operations at the agent application in interacting with the CMIP platform operations in FIGS. 4 and 5.

FIG. 9 is split into FIGS. 9A and 9B, and shows the flow of operations at the CMIP platform during the second and third phases of processing a delete request.

DESCRIPTION OF THE PREFERRED EMBODIMENTS

Figure 1A:
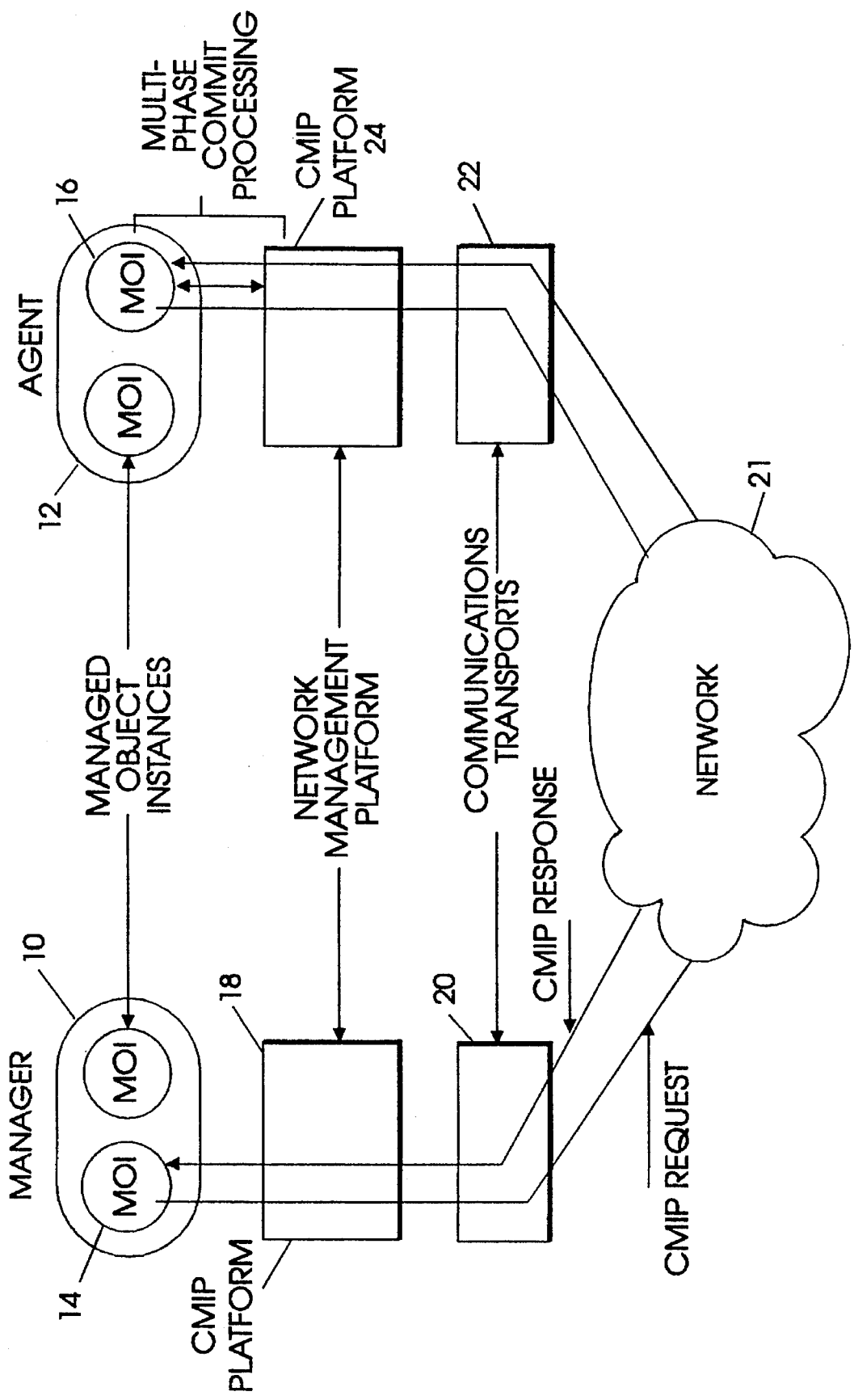
FIG. 1A is an overview of a manager application running on a CMIP platform in a first system, and an agent application running on a CMIP platform in a second system connected to the first system over a communications network.

In FIG. 1A, the manager application 10 is running on an operating system in a first computing system. The agent application 12 is running on an operating system in a second computing system. While this is a typical configuration for manager and agent applications, it is also possible to run the manager and agent applications on the same computing system. A managed object instance 14, in the manager application 10, communicates requests to a managed object instance 16 in agent 12. Viewing the systems from a software perspective, the requests are passed through the CMIP platform 18 and communication transports 20 in the system where the manager resides. The communication transports 20 send the requests over a communication network 21 to the communications transports 22 at the agent's computing system. Finally, requests are handled by the CMIP platform 24 working with the agent 12 and the MOI 16. Replies or responses from MOI 16 in the agent 12 are passed back to the manager MOI 14 via CMIP platform 24, transports 22 and 20, and CMIP platform 18. The invention resides, as indicated by the brackets labelled "Multi-Phase Commit Processing," in the logical operations of the agent, the agent MOI's, and the CMIP platform for the agent as these elements perform object creation and deletion requests from a manager MOI.

Figure 1B:
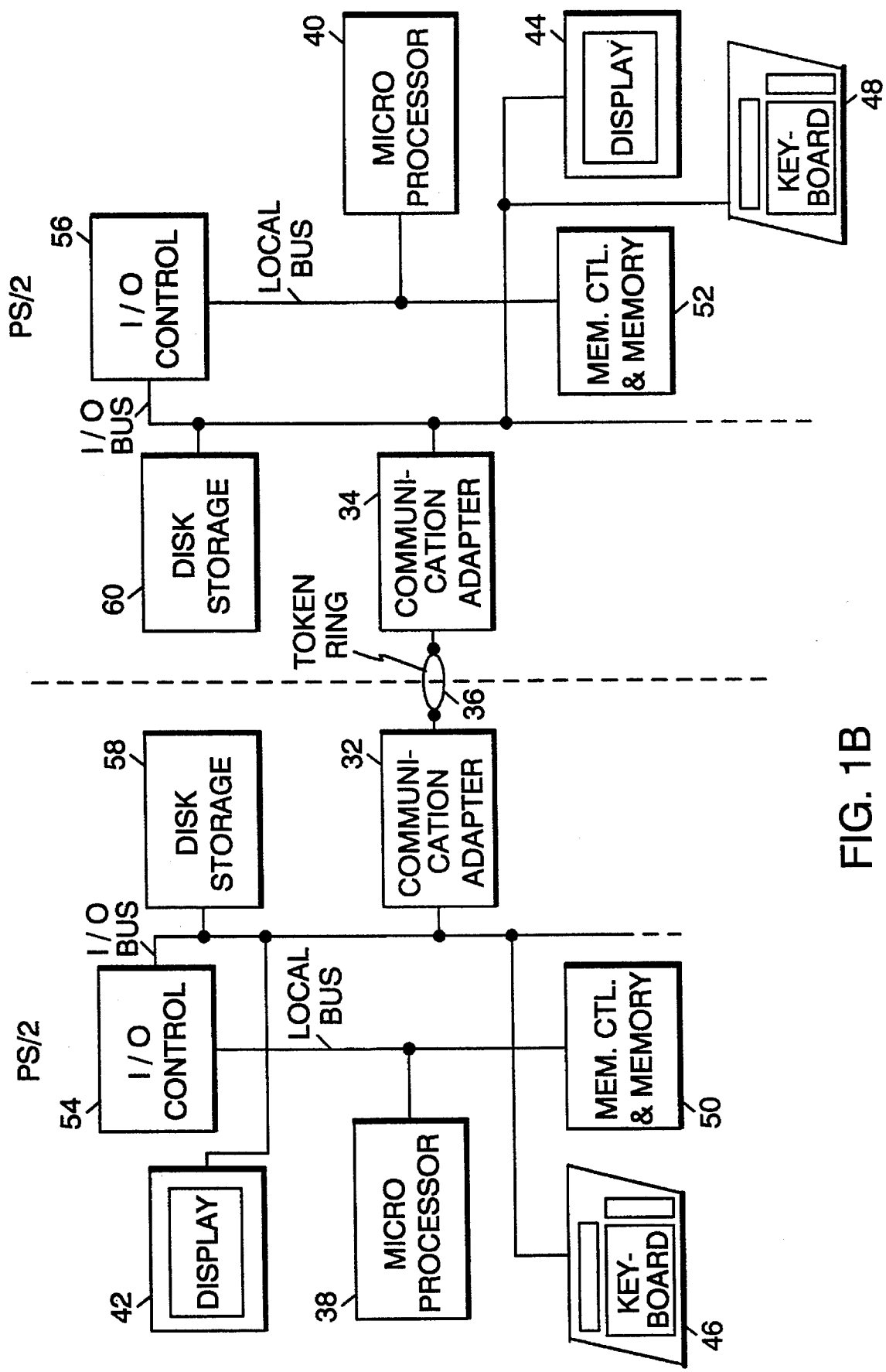
FIG. 1B illustrates one example of the first and second computing systems on which the CMIP platforms and manager and agent application programs are running.

The manager and application programs in FIG. 1A run on an operating system in an appropriate OSI computing system. FIG. 1B is exemplary of hardware to implement the invention. The open systems are IBM Personal System/2 computers connected to each other through communication adapters 32 and 34 via a token ring local area network 36. The communication adapter is connected to the I/O bus in each PS/2 computer. Each PS/2 computer has a local bus and an I/O bus. The local bus interconnects the microprocessor 38, 40, memory and memory control 50, 52 and I/O bus through I/O control 54, 56. The I/O control through the I/O bus provides access to the I/O devices, such as the display 42, 44, the keyboard 46, 48, disk storage 58, 60, the communication adapters 32, 34, printers (not shown), etc. The operating system running on this hardware is OS/2, and the communication software running on OS/2 is the OS/2 Communication Manager. The manager and agent application programs run on top of the CMIP platform. The CMIP platform runs on top of the OS/2 Communication Manager which, in turn, runs on top of the OS/2 operating system program. The communication transports of FIG. 1A are in the OS/2 Communication Manager.

While the invention is implemented in this preferred embodiment on PS/2 computers running the OS/2 operating system, any number of other open computing systems and platforms might be used, such as the IBM RS/6000 running AIX operating system, the IBM AS/400 running OS/400 operating system, or IBM System 390 running MVS or other operating systems.

Figure 2:
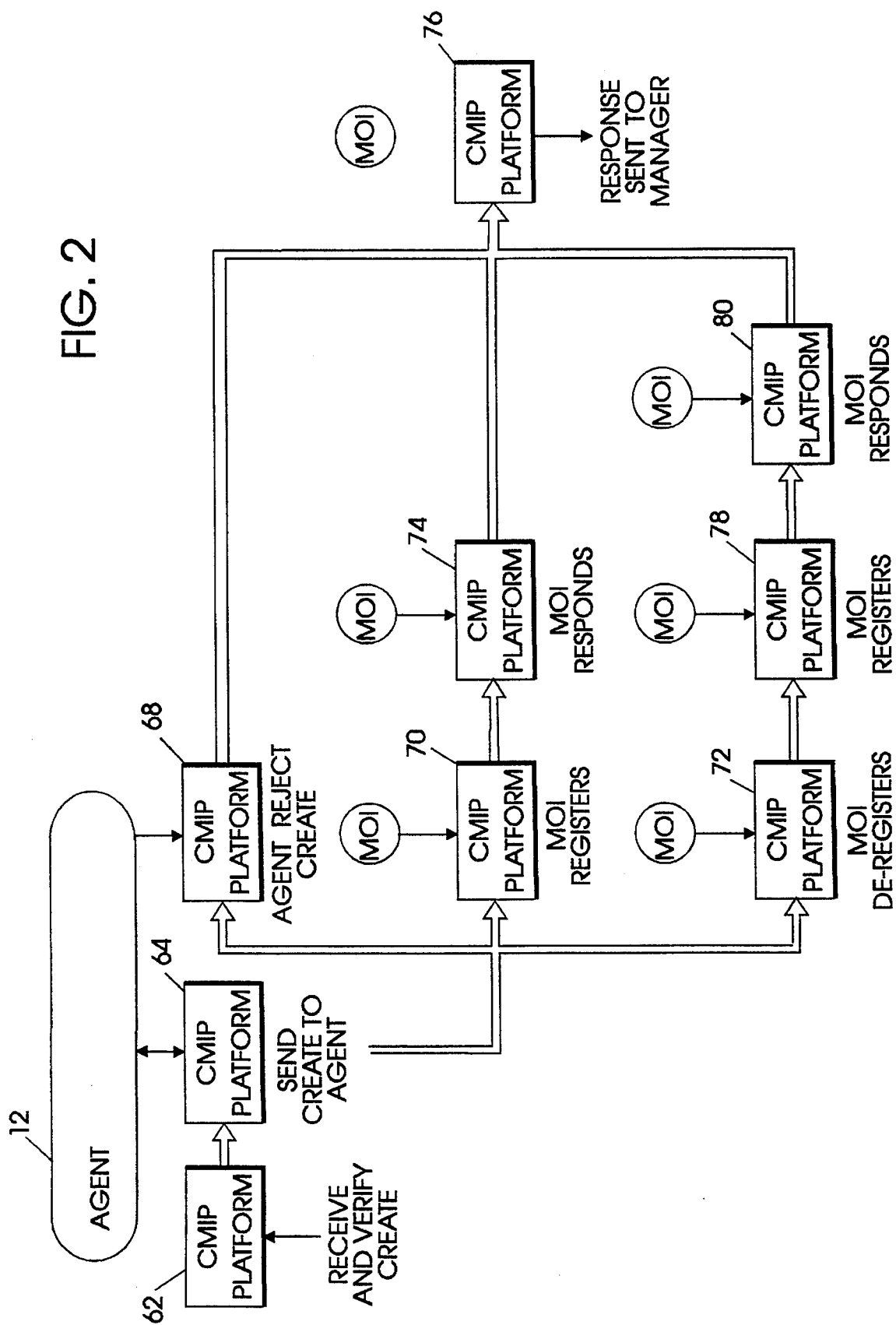
FIG. 2 shows the message flow and operative states of the CMIP platform, the agent and the MOI's operating in accordance with the invention during the creation of an object.

In FIG. 2, the message flows in the inventive multi-phase commit processing of object creation is illustrated. In state 62, the CMIP platform at the agent's system has received and verified the create request from a manager MOI. If the create request is valid, the CMIP platform in state 64 sends a create message to the agent 12.

There are three possible outcomes from the CMIP platform sending the create message to the agent. In state 68, the agent has decided that the create is not acceptable, and has sent a reject message back to the CMIP platform. The agent might reject the request because of insufficient memory or because the information, or attributes in the create request, was incompatible with the present setup of the agent.

In states 70 and 72, the agent has created the MOI, and the MOI responds to the CMIP platform. The MOI, at state 70, has accepted the attributes of the create request, including the name and other attributes and registers the MOI at the CMIP platform. Once the MOI is registered in the CMIP platform, it exists in the hierarchy of managed object instances that may be used in the system. At state 74, the agent sends back the MOI response indicating creation completed. In state 76, the successful creation response is passed from the agent's CMIP platform to the manager application.

In state 72, the MOI has accepted the create request, but not all the attributes of the request. For example, the name of the MOI might not be accepted. The MOI de-registers; i.e., removes any temporary or pending registration for itself from the CMIP platform in state 72. In state 78, the MOI registers itself in the CMIP platform with the correct attribute information. For example, if the MOI changed the name or other attributes during its creation, then the updated name and attributes would be registered with the CMIP platform. To update the manager with this MOI information, the MOI in state 80 responds with a creation successful message with all the updated attribute information. In state 76, this response is sent back to the manager. FIGS. 4, 5 and 6 described hereinafter show the details of the multi-phase commit processing of create requests.

Figure 3:
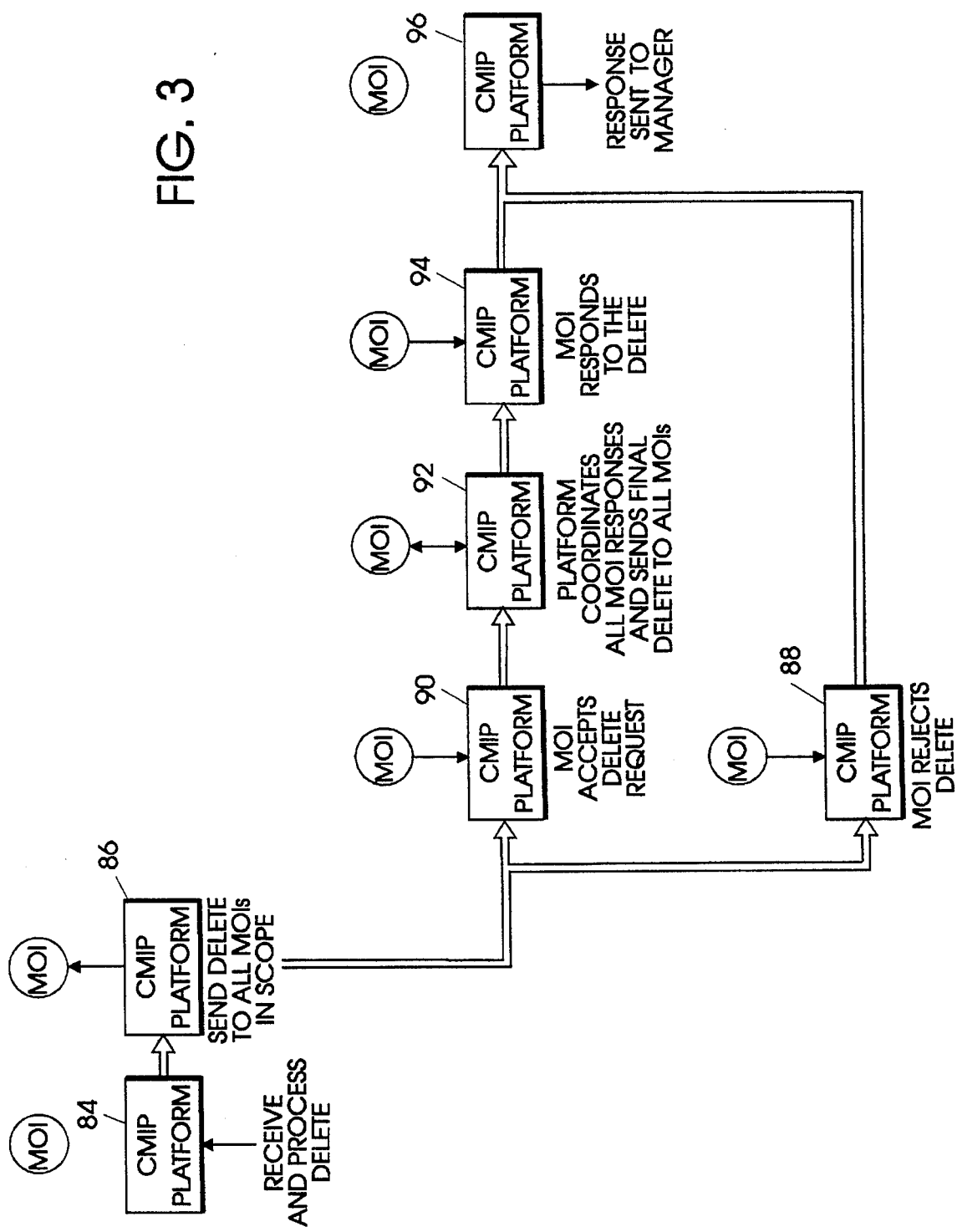
FIG. 3 shows the message flow and operative states of the CMIP platform, the agent and the MOI's operating in accordance with the invention during the deletion of an object.

FIG. 3 is the message flow and logical states of the CMIP platform/MOI interaction during a MOI delete operation using the multi-phase commit process. At state 84, the CMIP platform receives and processes the delete request from the manager. If the delete request is valid, the CMIP platform, in state 86, sends the delete to all MOIs within the scope of the delete request. Delete requests contain scope information that specifies the delete request applies to a base MOI and a subset of MOI's in the naming tree under the base MOI.

Once the delete request is sent to all MOIs identified, each MOI receiving the request may respond by either accepting, or rejecting, the delete request. In state 88, the MOI tells the CMIP platform that it rejects the delete request. One basis for rejection is that the delete request has a filter attribute associated with the request. This allows the delete request to be finely tuned to selected MOIs in a larger set of MOIs. To illustrate the use of a filter on the delete request, the request might have a scope of all modem MOIs and have a filter limiting the request to 2400 baud rate modems. Each modem MOI would receive the delete request but, if the MOI was not a 2400 baud rate modem, the MOI would reject the delete request. A MOI might also reject the delete request if it did not have enough memory to process the request, or the request had an attribute that was not logical for the condition of the MOI, or the MOI was busy processing and could not be deleted at that time.

The more typical response by an MOI is to accept the delete request and this occurs at state 90. State 92 collects, and coordinates, all of the MOI responses. In effect, state 86 places all the MOIs within scope of the delete request on a pending delete list. Each MOI on the list then responds that it accepts the delete request in state 90, or it rejects the delete request at state 88. State 92 collects these responses, removes from the pending delete list, the MOIs that rejected the delete, generates a final delete list, and sends an ok-to-delete message to the MOIs that accepted the delete request; i.e., the final delete list. In state 94, each MOI on the final delete list executes the delete request it received during state 86 and deletes itself. State 96 sends back a delete completed response which is passed by the CMIP platform, in state 96, back to the manager. State 96 will generate a delete response if any one of the MOIs in the original delete request are deleted. If none of the MOIs in the delete request are deleted, then state 96, in the CMIP platform, generates a response to tell the manager that no MOIs in the request were deleted. FIGS. 7, 8 and 9 described hereinafter show the details of the multi-phase commit delete processing of objects.

Figure 4B:
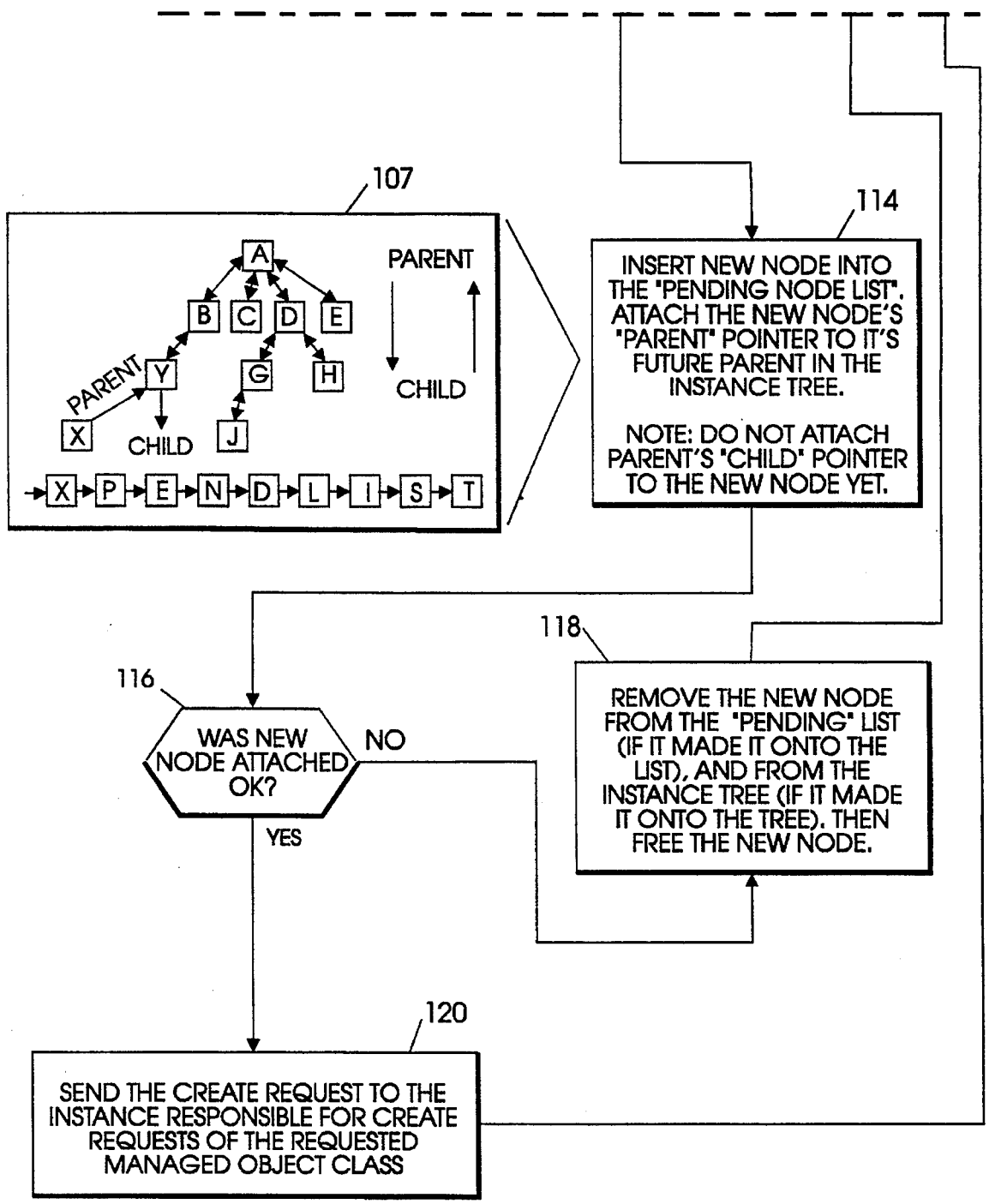
FIG. 4 is split into FIGS. 4A and 4B, and shows the flow of operations at the CMIP platform during the first phase of processing a create request.
Figures 5, 5A:
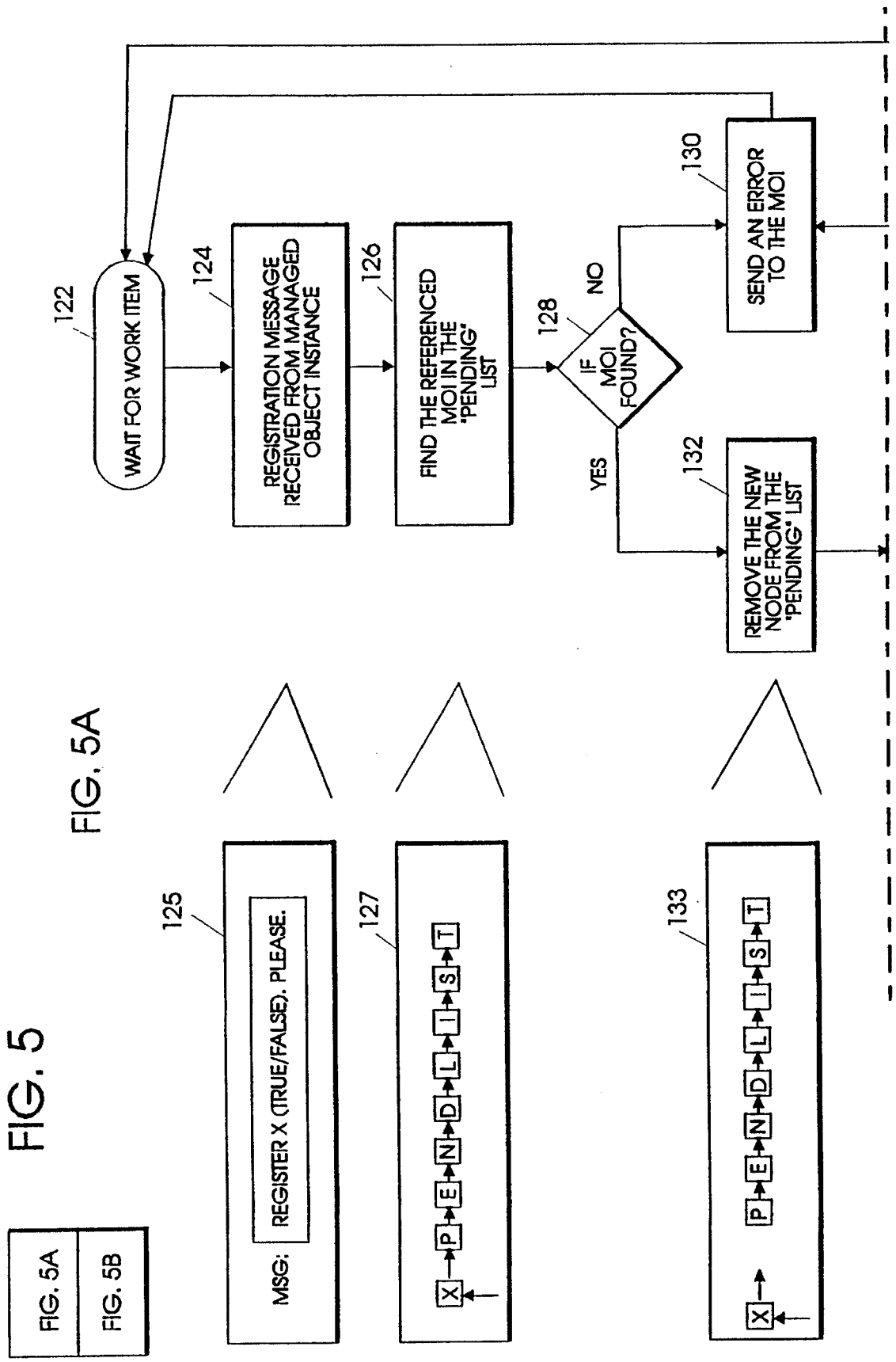
FIG. 5 is split into FIGS. 5A and 5B, and shows the flow of operations at the CMIP platform during the second and third phases of processing a create request.

FIG. 4 is split into FIGS. 4A and 4B. Further, the logical operations, or steps of the CMIP platform during a create process, flow down the right side of the figure and pictorials of the result of the operations are illustrated on the left side of the figure. In FIG. 4A, the CMIP platform initially is waiting for a work item at step 100. When operation 102 receives a create request in the CMIP platform work queue, the operations to handle a create request begin. Pictorial 101 depicts the create request. At step 104, the create request is validated. Validation, in this case, is checking the hierarchy of MOI's to verify that "X" MOI can be created, and that it can be created under "Y" MOI. Pictorial 107 in FIG. 4B shows the naming tree in the present example depicted by the pictorials 101, 103, 105 and 107. As shown in pictorial 107, an X MOI can be created under a Y MOI. If the create attributes for the X are also valid, decision operation 106 in FIG. 4A will branch Yes; i.e., the create request is valid.

If the create request had not been valid, the process flow would branch No from decision 106 to operation 108. For example, if X already existed under Y, or some of the attributes of X were invalid, decision operation 106 branches No. In operation 108, the CMIP platform sends a Remote Operation Error (ROER) message to the manager, and returns to the wait step 100 for the next work item.

If the process branches Yes at decision 106, the CMIP platform in step 110 allocates, and fills, a pending instance node, pictorial 105. A pending instance node is as near as possible to any instance in the tree of MOIs; i.e., as much of the MOI attributes as possible are filled in. However, the pending instance node is not attached to the tree yet. Decision operation 112 then tests whether the allocation and filling operation 110 was successful. If it was not, the process branches to operation 108, and an error message is sent to the manager.

If the node was allocated and filled correctly, the process branches to operation 114 in FIG. 4B. Operation 114 adds the node to a pending node list, and attaches the new node's parent pointer to the future parent; i.e., Y in the instance tree. Pictorial 107 shows the new node X with a parent pointer attached from the node X to parent node Y. Operation 114 sets the child pointer (pointer from Y to X) to a null. This prevents the new node from being an operative node in the tree. If the child pointer from Y to X were filled in, then other nodes searching down from A in the tree would find X and treat X as an operative node. Decision operation 116 then tests whether the new node was attached correctly via the parent pointer. If the new node was not successfully attached to the parent node, or was not successfully attached to the pending list, at step 118 the new node is removed from the pending list depicted in pictorial 107, is removed from the tree, and the node allocation is freed. Following operation 118, an error message is sent back to the manager.

If the new node was attached OK, the process branches from decision 116 to operation 120. In operation 120, the CMIP platform sends the create request to the instance responsible for create requests of the requested managed object class. In this case, that instance is the agent application that will contain the created MOI. In effect, since the new MOI is not yet created, it cannot respond to the create request. Therefore, the agent acts for the MOI being created. After the create request is sent to the agent, the CMIP platform returns to wait step 100 to wait for the next create request.

Figure 5B:
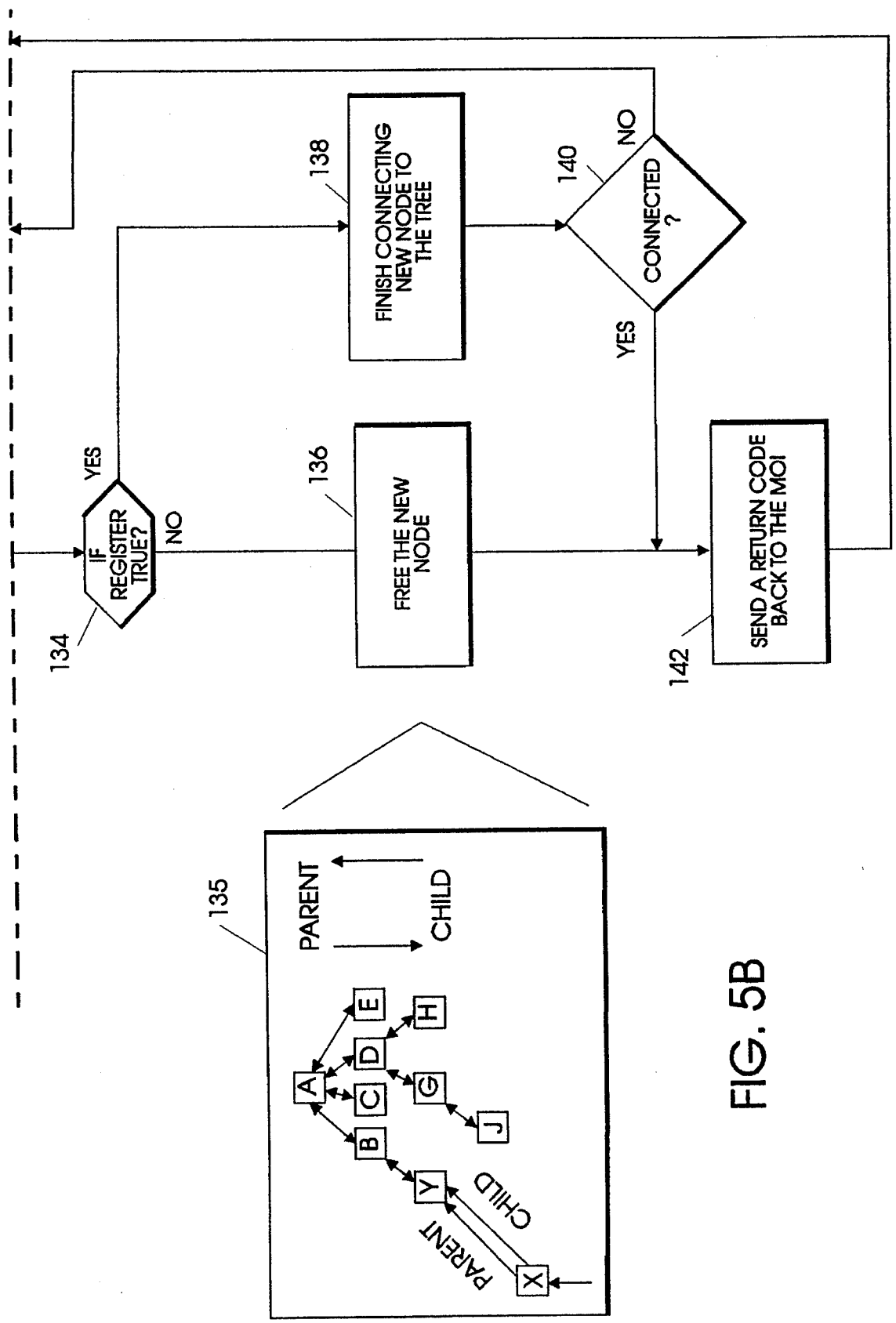

At this point, in the multi-phase commit processing of a create request, the pending instance (MOI) from the CMIP platform's perspective is waiting for registration as a new MOI so that the create can be completed. This process is shown in FIG. 5 which consists of FIGS. 5A and 5B. At step 122, the CMIP platform in FIG. 5A is waiting for a registration message from the created MOI. Operation 124 receives the message from the MOI. The message is depicted in pictorial 125; the message states whether or not the X MOI wishes to register itself in the CMIP platform; i.e., true equals register, and false equals de-register. Operation 126 looks for the X node in the pending list. The list is shown in pictorial 127. Other create requests being processed by the CMIP platform are depicted by the letters PENDLIST where each letter indicates the name of a future MOI.

Decision operation 128 tests whether the X node was found on the pending list. If the X node is not found on the pending list, the process branches to operation 130. Operation 130 sends back an error message to the X MOI telling the MOI that the registration message referred to a node, not on the pending list. If the X node is on the list, the process branches to operation 132. Operation 132 removes the X node from the pending list, as shown in pictorial 133. Decision operation 134 then tests whether the registration message is true or false. If the message is false, at step 136 the X node is freed and all information stored for the X node is removed. A return code is sent back from operation 142 that no registration was accomplished.

If the message is true, the child pointer from Y to X in the naming tree, as shown in pictorial 135, is made by operation 138. By so doing, operation 138 finishes connecting the new node X into the tree; MOIs may now find and perform tasks with the X MOI. Decision operation 140 is a validity check that tests whether the connection to the tree was successful. If the connection was not successful, the process branches to operation 130 to send an error message to the X MOI. If the connection was successful, operation 142 sends a connection successful message back to the X MOI.

The operations of the agent application during the multi-phase commit processing of a create request are shown in FIG. 6. At step 144, the agent is waiting for a work item which, in this case, is the create request passed from the CMIP platform. The create request is received at operation 146, and is read and validated in operation 148. Decision operation 150 tests whether the create request is valid. If the agent decides the request is not valid, the process branches to operation 152. Operation 152 performs two tasks. It sends a Remote Operation Error (ROER) message back to the manager, and it deletes the node from the pending list in the CMIP platform. This operation corresponds to the MOI rejecting the create request, as described for state 68 in FIG. 2.

If decision operation 150 finds that the create request was valid, then decision operation 154 in the created MOI tests whether the information and attributes for the create are acceptable. If they are not acceptable, the process branches to operations 156 and 158. Operation 156 deletes the node from the pending list at the CMIP platform, and operation 158 creates attribute information acceptable to the new MOI. Operation 160 then sends the registration message to the CMIP platform to register the new MOI as a node on the tree.

Decision operation 162 is looking for the return code from the CMIP platform (FIG. 5) to determine whether the registration was successful. If the registration is OK, operation 164 sends the create information response to the manager, and the process returns to wait step 144. If the registration was not accomplished, the process branches to operation 166. Operation 166 cleans up the storage of any local information in the agent relating to the attempt to create the MOI and frees the allocated storage space. Thereafter, operation 152 sends an error message to the manager, and deletes the new node from the pending registration list at the CMIP platform. This process in FIG. 6 repeats for each create request, and operates in conjunction with the processing of create requests by the CMIP platform, as described above for FIGS. 4 and 5.

Figure 7B:
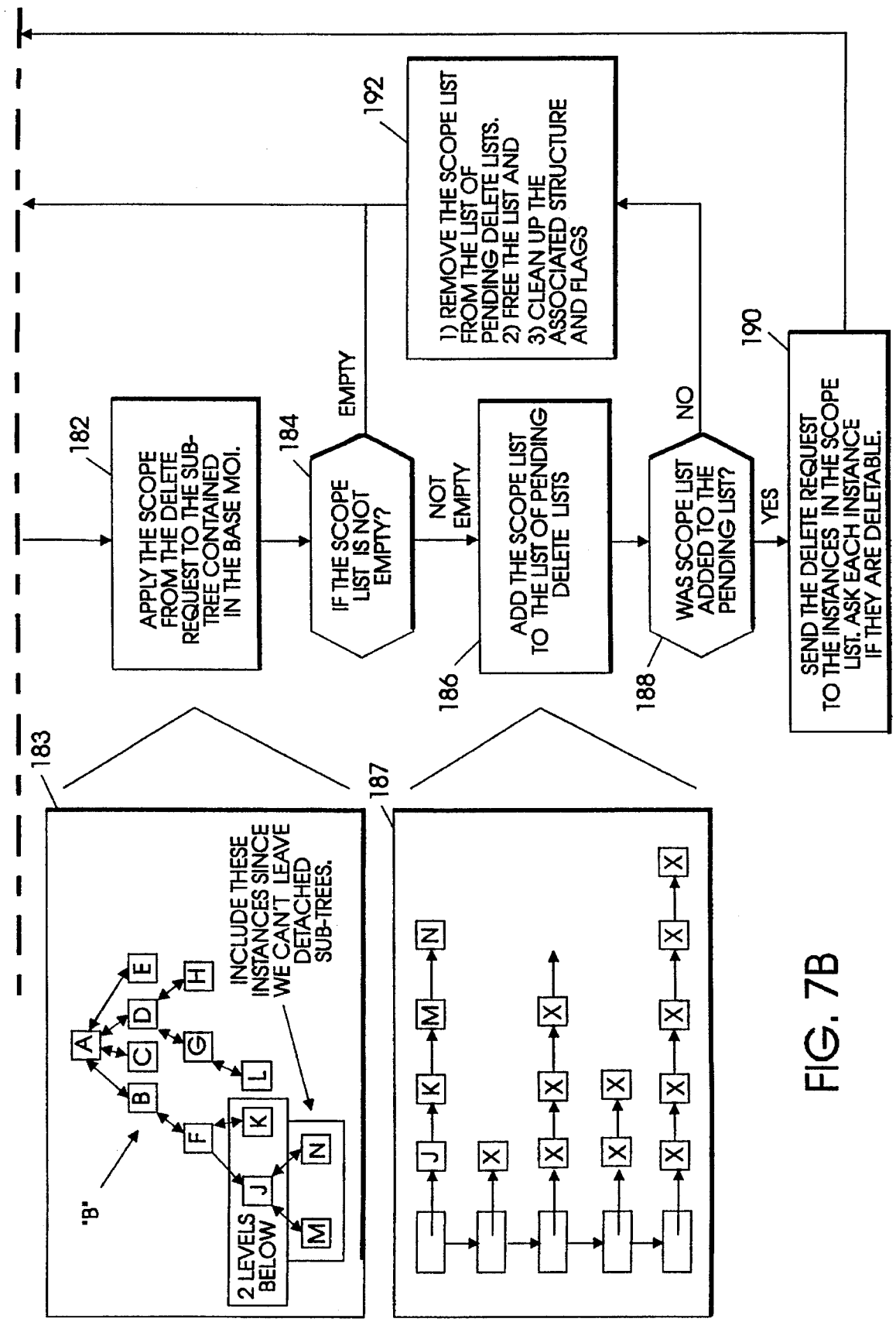
FIG. 7 is split into FIGS. 7A and 7B, and shows the flow of operations at the CMIP platform during the first phase of processing a delete request.

In FIG. 7, the details of the multi-phase commit processing of delete requests at the CMIP platform are shown. This process was described at a higher level earlier with reference to FIG. 3. FIG. 7 is composed of FIGS. 7A and 7B, and include pictorials of the results of operations, as well as illustrating the flow of the logical operations. In FIG. 7A, at step 170, the CMIP platform is waiting for a work item. Operation 172 receives a delete request from the manager application. In this example, the delete message (shown in pictorial 173) is delete all nodes (MOI's) two levels below the "B" node. Operation 174 begins the processing of this request by reading and validating the information and attributes in the request. After validation, the CMIP platform, at step 176, locates the base managed object instance in the naming or instance tree. In this case, the base managed object instance for the delete request is "B" (see node B in pictorial 177).

Decision operation 178 then tests whether B was found in the instance tree. If it was not found, operation 180 sends an error message back to the manager. If the B instance or node in the tree was found, the process flows on to step 182 in FIG. 7B. The CMIP platform, in step 182, applies the scope of the delete request to the subtree contained in the B MOI. Since the scope was two levels below B, the scope would include nodes J and K in pictorial 183. However, if J and K are deleted, nodes M and N would be left unattached. Since this is not a valid operative condition for nodes M and N, these nodes are also included in the scope.

Decision operation 184 then checks to see that the scope list is not empty; i.e., there are nodes to be deleted. If the list was empty, this would be an error condition, and the process branches back to operation 180 to send an error message to the manager. In the example, the scope list is not empty, so the process branches to operation 186. In operation 186, the CMIP platform adds the scope list to a list of pending delete lists, as shown in pictorial 187. The present scope list J-K-M-N is added as a pending delete list on top of four other pending delete lists whose nodes are simply indicated by X's.

Decision operation 188 then tests to see that the scope list was successfully added to the pending delete lists. If operation 186 was successful in adding the scope list to the delete list, the process branches to operation 190. Operation 190 sends the delete request to each MOI in the scope list, and asks each MOI if it is deletable. This completes the first phase of processing a delete request, and corresponds to state 86 in FIG. 3. After the delete request is sent, the process returns to wait step 170 in FIG. 7A. If operation 188 detects that the scope list was not added to the pending list, then operation 192 performs three tasks to clean up the data structures. First, operation 192 removes, from the pending delete list, any portion of the scope list that made it onto the pending delete list. Second, it frees the pending delete list it added to the top of the lists. Third, it cleans up associated structures and flags set up in the CMIP platform.

Figure 8A:
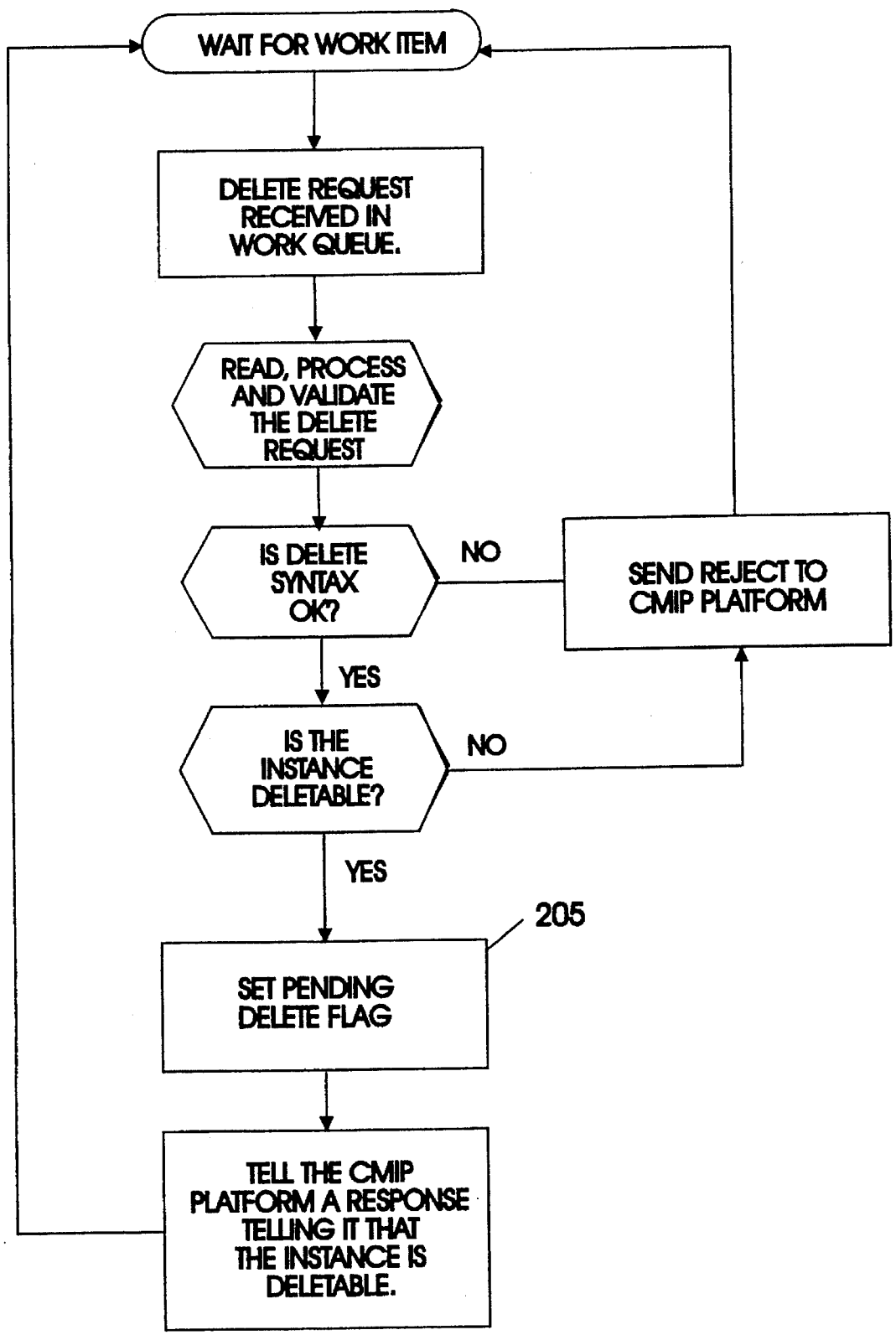
FIG. 8A shows the flow of operations at the agent application in responding to the first phase of operations of the CMIP platform in FIG. 7.

FIG. 8A shows the processing of the delete request by each MOI in the agent that receives the delete request from the CMIP platform. The MOI, at step 194, is waiting for a work item. Operation 196 receives the delete request, and operation 198 reads and validates the delete request. Decision operation 200 tests the syntax of the delete request. If there is an error in syntax, operation 202 sends the reject message to the CMIP platform, as discussed previously for FIG. 3. If there is no error in syntax, decision operation 204 checks whether the MOI is deletable. If it is not deletable, operation 202 sends a reject to the CMIP platform. If the MOI is deletable, operation 205 sets a pending delete flag in the MOI, and operation 206 in the MOI sends the CMIP platform a response indicating it is deletable. In effect, the CMIP platform has asked are you deletable, and the MOI has checked the attributes of the request and checked it's own processing, and concluded it could be deleted. The MOI then replies I am deletable if you want to delete me. This corresponds to state 90 in FIG. 3. Similarly, the reject response at operation 202 from the MOI to the CMIP platform corresponds to state 88 in FIG. 3.

FIG. 9 illustrates the CMIP platforms processing of the delete response from each MOI that was asked if it could be deleted. FIG. 9 consists of FIGS. 9A and 9B. At step 208, the CMIP platform is waiting for work items. Operation 210 receives the delete message from an MOI. The message is depicted in pictorial 209 as a positive response; i.e., the MOI is deletable. Operation 212 reads and validates the delete response, and operation 214 stores the response for each MOI in the scope list added to the pending delete list. Pictorial 215 shows the scope list as the pending delete list. Each Y on a node in the list represents an acceptance of the delete request, and each N on a node represents a rejection of the delete request. In effect, each node is marked as whether it is deletable or not by operation 214.

Decision 216 then checks to see if there are more delete replies due from the MOI's on the delete list. If all MOIs on the list have not responded, the process returns to the wait step 208 waiting for the next MOI response. If all delete replies have been received from MOIs, operation 218 in FIG. 9B performs three tasks. Operation 218 first cleans up, and verifies, the delete list. It then removes from the delete list instances that rejected the delete request. In this example, node M in the delete list is marked with an N indicating that "M" MOI rejected the delete request. As its third task, operation 218 removes from the delete list any parent node whose child node represents an MOI that rejected the delete request. This is because the child node cannot be left unattached to the tree. In the present example shown in pictorial 219, J is the parent of M. Therefore, since M is not deletable, J is also not deletable. J and M are removed from the delete list, and the delete list, as shown in pictorial 219, now contains K and N.

Decision operation 220 then checks to see if there are any MOIs left on the delete list. If there were none, the process branches to operation 221 in FIG. 9A to send an error message to the manager, and to clean up the files for the pending delete. In the present example, K and N MOIs are still on the delete list, so the process branches to operation 222 which deletes the K and N nodes from the tree, as shown in pictorial 223. Operation 224 then sends the final delete message to the K and N MOIs which are still on the delete list. For K and N, the final delete message is "Final Delete True." The final delete message is also sent to parent instances who said they were deletable but were removed from the list because their children were not deletable. For these parent instances, the final delete message is "Final Delete False," and in the example, this message goes to the J MOI. K and N MOIs then delete themselves. After operation 224, the process returns to the wait step 208 in FIG. 9B waiting for the next work item.

Figure 8B:
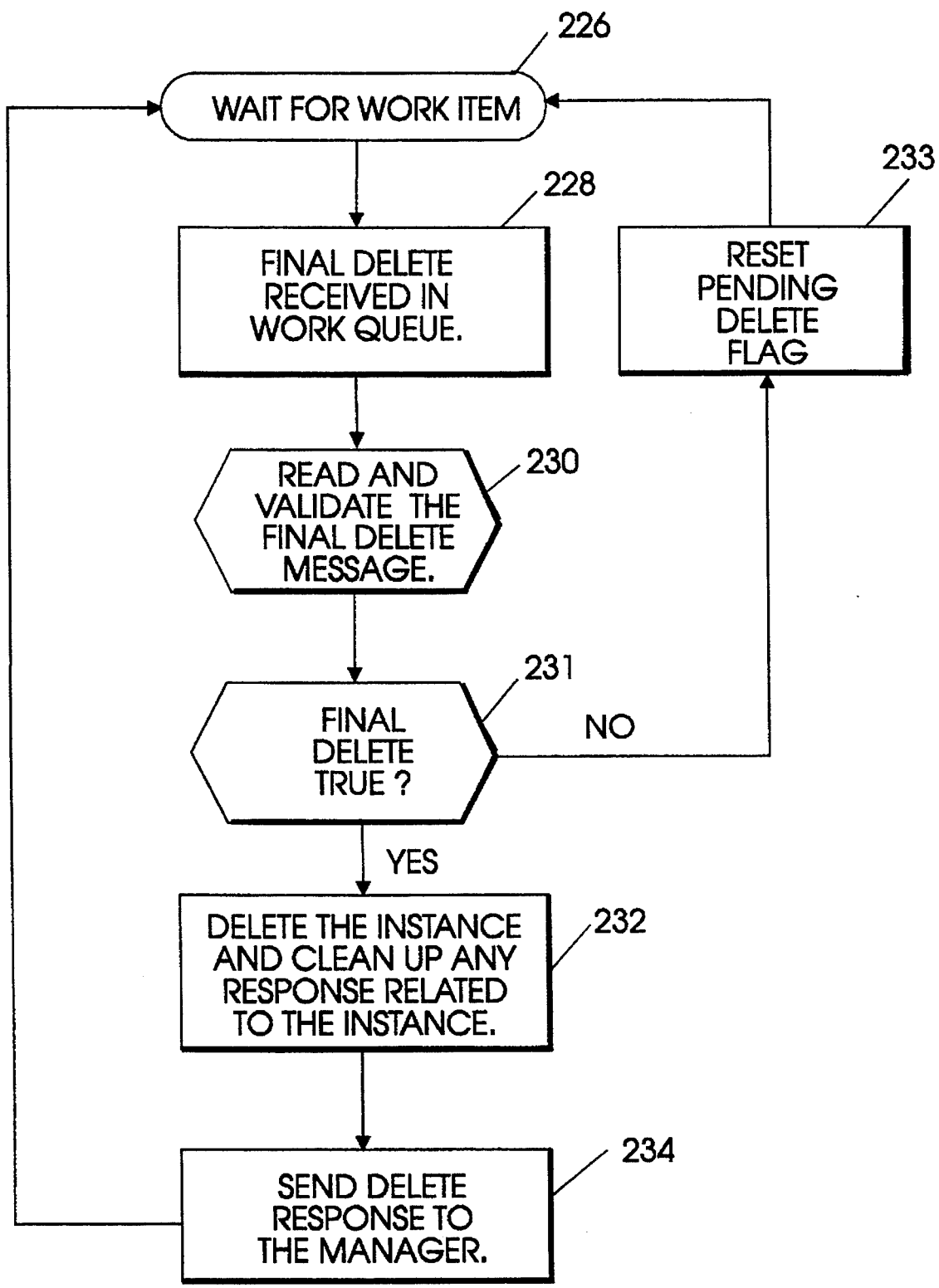
FIG. 8B shows the flow of operations at the agent application in responding to the second and third phases of operations of the CMIP platform in FIG. 9 to execute the delete of a managed object instance.

In FIG. 8B, each MOI being deleted executes the final delete. At step 226, the MOI is waiting for a work item. Operation 228 receives the final delete message from the CMIP platform. The final delete message is read and validated in step 230. Decision operation 231 then tests whether the final delete message was true or false. If the message was false, the MOI is not to be deleted even though if the MOI answered in FIG. 8A that it was deletable. In the example, this is the case for node J in the tree, since M is not deletable. The process branches NO from operation 231 to operation 233, and operation 233 resets the pending delete flag in the J MOI to off.

If final delete message is true, the process branches YES from decision operation 231 to operation 232. In operation 232, the MOI being deleted then deletes itself and cleans up any data structures relating to the resource managed by the MOI. Finally, in operation 234, the agent sends a delete response to the manager. This completes the multi-phase commit processing of the delete request from the manager.

While a number of preferred embodiments of the invention have been shown and described, it will be appreciated by one skilled in the art, that a number of further variations or modifications may be made without departing from the spirit and scope of our invention.

What is claimed is:

1. In a computing system having manager applications (manager) that manage Managed Object Instances (MOI) in agent applications (agent) running on top of a management services platform, a method for multi-phase commit processing of requests by a manager application to a agent application, the requests identifying action to be taken on a requested MOI at the agent application, said method comprising the steps of:

registering the request for the requested MOI as an action pending entry on a pending list in said platform;

sending the request to the agent to determine whether the MOI accepts or rejects the request;

determining whether the request is acceptable;

if the request is acceptable, changing the pending action entry to a final action entry for the requested MOI; and sending a message to the requested MOI to execute the request; and executing the request.

2. The method of claim 1 wherein the request is a create or delete request whereby the manager applications create and delete Managed Object Instances (MOI) in agent applications, said method further comprising the steps of:

verifying the create or delete request at the platform before said registering step;

said registering step registers a create or delete request as a pending node in a tree hierarchy of nodes where each node represents an MOI and the tree indicates how the nodes operatively reference each other;

marking the pending node as a final node if the create or delete request is acceptable;

for each final node, executing a connection of the node to the tree for the MOI created by the request or deleting the MOI to be deleted by the request, and sending a response to the manager indicating whether or not the request was completed.

3. In a computing system having a manager application that creates and deletes managed object instances (MOIs) within a plurality of MOIs contained in an agent application running on a management platform, said MOIs organized in an MOI hierarchy mapped as an MOI tree, a computer implemented method for multi-phase commit processing of a create MOI request sent by the manager to the agent comprising the computer implemented steps of:

receiving the create MOI request within the platform;

validating the create request within the platform by checking the MOI to be created against the MOI hierarchy;

registering the requested MOI within the platform as a pending instance node in the MOI tree;

sending a create request for the requested MOI from the platform to the agent, testing at the agent whether the create request is acceptable;

deleting the pending instance node from the MOI tree if the agent indicates the create request is unacceptable;

finish connecting the pending instance node to the MOI tree, if the agent indicates the create request is acceptable, whereby the MOI becomes operative in the MOI hierarchy.

4. The method of claim 3, wherein the registering step includes the steps of:

allocating a pending instance node for the requested MOI;

attaching the pending instance node to the MOI tree with a pointer that points to a parent node for the pending instance node.

5. The method of claim 3, further comprising the steps of:

said testing step testing whether the create request is valid;

said deleting step deleting the pending instance node at the platform if the request is not valid;

said testing step testing whether the create request if valid also includes acceptable attributes;

changing the attributes of the create request to acceptable attributes and indicating the create request is acceptable.

6. The method of claim 3 further comprising the step of:

sending a message to the manager indicating whether the requested MOI was created.

7. In a computing system having a manager application that creates and deletes managed object instances (MOIs) within a plurality of MOIs contained in an agent application running on a management platform, said MOIs organized in an MOI hierarchy mapped as an MOI tree, a computer implemented method for multi-phase commit processing of a delete MOI request sent by the manager to the agent comprising the computer implemented steps of:

receiving at the platform a delete MOI request from the manager;

validating the delete request within the platform;

registering each MOI within the scope of the delete request in a pending delete list;

sending a delete request to each MOI in the pending delete list;

determining whether each MOI receiving a delete request is deletable;

generating a final delete list containing only those MOIs on the pending delete list that said determining step determines to be deletable;

deleting the MOIs on the final delete list.

8. The method of claim 7, further including the step of:

sending a message to the manager to inform the manager of whether any MOIs were deleted.

9. The method of claim 7, wherein the pending delete list delete includes "child" MOIs that are dependent in the MOI tree from "parent" MOIs within the scope of the delete request.

10. The method of claim 9, wherein said determining step comprises the steps of:

determining if each child MOI is deletable;

determining if the parent MOI of a deletable child MOI is deletable;

identifying both the parent MOI and the child MOI as deletable only if both are deletable.

11. In an interconnected computing system having a manager application (manager) in a first computing system and an agent application (agent) in a second computing system and wherein the manager creates and deletes managed object instances (MOIs) in the agent via a common management information protocol (CMIP) platform, apparatus for multi-phase commit processing of a create or delete MOI request sent by the manager to the agent, said apparatus comprising:

receiving means in the CMIP platform for receiving and validating a create or delete MOI request from the manager to thereby generate validated requests;

means responsive to the receiving means for adding validated requests to a pending request list in the CMIP platform;

means for sending a validated request from the CMIP platform to the agent;

means at the agent for testing whether the validated request is acceptable;

means responsive to said testing means for marking pending requests on the pending request list in the CMIP platform as final requests if the validated request is acceptable;

means responsive to the final request list in the CMIP platform for executing each final request at the agent.

12. The apparatus of claim 11 further comprising:

means for sending a message to the manager to tell the manager which MOIs were created or deleted.

13. The apparatus of claim 11 further comprising:

means for creating a modified MOI if the agent application modifies a validated create request.

14. The apparatus of claim 11 further comprising:

means for adding "child" MOIs of "parent" MOIs in the delete request to the pending delete list.

15. The apparatus of claim 14 wherein:

said marking means removes from the final request list all delete requests for "parent" MOIs of "child" MOIs that may not be deleted.

* * * * *